(12) United States Patent
Duan et al.

(10) Patent No.: US 12,535,721 B2
(45) Date of Patent: Jan. 27, 2026

(54) PHOTOGRAPHIC EQUIPMENT ASSEMBLY AND TELESCOPIC SUPPORT THEREOF

(71) Applicant: ZHONGSHAN DASHAN PHOTOGRAPHIC EQUIPMENT CO., LTD., Guangdong (CN)

(72) Inventors: Jinhua Duan, Guangdong (CN); Xihua Zhu, Guangdong (CN)

(73) Assignee: ZHONGSHAN DASHAN PHOTOGRAPHIC EQUIPMENT CO., LTD., Zhongshan (CN)

( * ) Notice: Subject to any disclaimer, the term of this patent is extended or adjusted under 35 U.S.C. 154(b) by 166 days.

(21) Appl. No.: 18/510,575

(22) Filed: Nov. 15, 2023

(65) Prior Publication Data

US 2024/0337912 A1    Oct. 10, 2024

(30) Foreign Application Priority Data

Apr. 7, 2023   (CN) .......................... 202310374271.2

(51) Int. Cl.
    *G03B 17/56*   (2021.01)
    *F16M 11/28*   (2006.01)

(52) U.S. Cl.
    CPC ........... *G03B 17/561* (2013.01); *F16M 11/28* (2013.01); *F16M 2200/027* (2013.01)

(58) Field of Classification Search
    CPC ............................. F16M 11/32; F16B 7/1463
    See application file for complete search history.

(56) References Cited

U.S. PATENT DOCUMENTS 7,845,602 B1    12/2010   Young et al.

FOREIGN PATENT DOCUMENTS

| CN | 201539675 U | * | 8/2010 |  |
| CN | 216046680 U | * | 3/2022 |  |
| CN | 115388300 A | * | 11/2022 | ............. F16M 11/18 |

OTHER PUBLICATIONS

Extended European Search Report Dated May 22, 2024 for Corresponding European Application No. 23215035.9.
Office Action Dated Jun. 23, 2025 for Corresponding Chinese Patent Application No. 202310374271.2.

* cited by examiner

*Primary Examiner* — Leon W Rhodes, Jr.

(57) ABSTRACT

A telescopic support for photographic equipment, comprising a tube component, a locking component arranged on the tube component, a supporting component mounted on the locking component, and a linkage component arranged in the tube component, the locking component comprising a housing mounted at an upper end of a first tube of the tube component, a driving component, a first base, a locking member, and a second base, a part of the driving component is arranged in the housing, and other part is arranged in the first tube, the first base is fixed at an lower end of the first tube, the locking member is arranged in the driving component and can move relative to the driving component, the second base is mounted on the first base, the driving component passes through the first tube and the first base in a vertical direction and extends into the second base.

12 Claims, 15 Drawing Sheets

PHOTOGRAPHIC EQUIPMENT ASSEMBLY AND TELESCOPIC SUPPORT THEREOF

CROSS-REFERENCE TO RELATED APPLICATIONS

The present application claims priority of Chinese Patent Application No. 202310374271.2, filed on Apr. 7, 2023, the entire contents of which are hereby incorporated by reference.

TECHNICAL FIELD

The present invention relates to the field of photography equipment technology, and more particularly to a telescopic support and a photographic equipment assembly with the telescopic support.

DESCRIPTION OF THE PRIOR ART

A telescopic support can support a photographic equipment such as a camera, monitor, and fill light, and can adjust their height to improve a stability of the photographic equipment during use. The conventional telescopic support includes a one-legged telescopic support and a three-legged telescopic support, wherein each support leg typically has a plurality of tubes connected together and a locking device set between adjacent tubes. The adjacent tubes can be adjusted up and down, and their relative positions are locked by the locking device. When adjusting the height of the telescopic support, it is necessary to manually release the locking device first, and then a plurality of tubes can be telescopically adjusted. When the required height is reached, the locking device is manually tightened to lock the relative position between the plurality of tubes, which thereby causing an adjustment of the telescopic support to be complicated, time-consuming, and labor-intensive, and even miss the opportunity to capture the crucial moment of a photo or a video.

SUMMARY OF THE DISCLOSURE

The main objective of the present invention is to provide a telescopic support for photographic equipment which solves or at least alleviates the aforementioned problems, as well as a photographic equipment assembly with the telescopic support.

A telescopic support for photographic equipment, comprising: a tube component, a locking component arranged on the tube component, a supporting component mounted on the locking component, and a linkage component arranged in the tube component, the locking component comprising a housing, a driving component, a first base, a locking member, and a second base, wherein the housing is mounted at an upper end of a first tube of the tube component, a part of the driving component is arranged in the housing, and other part is arranged in the first tube, the first base is fixed at an lower end of the first tube, the locking member is arranged in the driving component and is capable of moving relative to the driving component, the second base is mounted on the first base, and the driving component passes through the first tube and the first base in a vertical direction and extends into the second base.

In some embodiments, the driving component comprises a driving member mounted in the housing, a rod which is capable of being pushed by the driving member, a first elastic element sleeved on an outer side of an upper axial end of the rod and abutted against the driving member, and a locking seat connected with a lower axial end of the rod.

In some embodiments, two axial ends of the rod respectively extend beyond two axial ends of the first tube, the rod extends downwards to the first base, and exits from the first base to the second base.

In some embodiments, the locking seat is located between the first base and the second base, and is capable of moving relative to the first base and the second base.

In some embodiments, the locking seat is provided with a locking seat body, at least one slot, at least one through hole, and a connecting column; the at least one slot is opened on a circumferential wall of the locking seat body, and is facing downwards; the at least one through hole is arranged on the circumferential wall of the locking seat body, and runs through the circumferential wall of the locking seat body along the radial direction thereof; the connecting column is arranged below the locking seat body, a lower axial end of the rod is located in the connecting column, and a connecting pin is inserted into the connecting column to connect the lower axial end of the rod with the connecting column.

In some embodiments, the first base comprises a first base body and a first slope arranged on a lower side of the first base body.

In some embodiments, the locking member located in the through hole is provided with a second slope which fits with the first slope.

In some embodiments, the locking member is provided with a friction plate on a side away from the second slope.

In some embodiments, the second base comprises a second base body, a connecting rod arranged on an upper side of the second base body, and a recess arranged on a lower side of the second base body.

In some embodiments, an interior of the second base body is provided with a receiving hole with an opening facing upwards; the locking seat is partially received in the receiving hole; a second elastic element is arranged in the receiving hole and abuts against between the connecting column and the receiving hole; and the connecting rod is capable of being engaged in the slot of the locking seat.

In some embodiments, the linkage component comprises a fixed seat arranged at a lower end of the second tube of the tube component, a rotating wheel mounted in the fixed seat, and a linkage member which is wound around the rotating wheel.

In some embodiments, the linkage member enters into one end of the receiving slot along an inner side of the second tube from the recess, winds out from a gap between the rotating wheel and the receiving slot, extends from other end of the receiving slot, and then extends along an outer side of the second tube.

In some embodiments, adjacent tubes of the tube component are sleeved through a connecting sleeve; the connecting sleeve comprises a tube sleeve mounted on corresponding tubes, a barrier plate mounted on the tube sleeve, and at least one wheel set arranged in the tube sleeve, wherein the at least one wheel set is pressed towards a tube sleeved in the corresponding tube through a wedge block.

The present invention further provides a photographic equipment component, comprising the above telescopic support and a photographic equipment mounted on the telescopic support.

The telescopic support for photographic equipment provided by the present invention is capable of easily and quickly locking and releasing a connection between the

Reference numbers list: 900—photographic equipment assembly; 200—telescopic support; 1—supporting component; 11—tripod head; 12—connecting seat; 2—locking component; 21—housing; 211—opening; 22—driving component; 221—driving member; 212—first portion; 213—second portion; 214—projection; 141—first contact surface; 222—rod; 223—locking seat; 2230—locking seat body; 2231—engaging hole; 2232—slot; 2233—through hole; 2234—connecting column; 224—first elastic element; 225—block member; 251—second contact surface; 226—sleeve; 2261—step hole; 2262—flange; 227—connecting pin; 23—first base; 231—first base body; 232—first slope; 233—first mounting hole; 234—fixed pin; 24—locking member; 241—second slope; 242—friction plate; 25—second elastic element; 26—second base; 261—second base body; 262—recess; 263—connecting rod; 264—receiving hole; 265—second mounting hole; 3—tube component; 31—first tube; 32—second tube; 33—third tube; 34—first connecting sleeve; 35—second connecting sleeve; 36—tube sleeve; 361—groove; 611—third slope; 612—plane; 362—mounting portion; 37—wedge block; 38—wheel set; 381—wheel frame; 382—connecting shaft; 383—wheel; 39—barrier plate; 4—linkage component; 41—fixed seat; 411—receiving slot; 42—rotating wheel; 43—linkage member.

DESCRIPTION OF EMBODIMENTS

In order to make the purpose and advantages of the present invention clearer, the following will provide a further detailed explanation of the present invention in conjunction with the accompanying drawings and embodiments. It should be clear that the specific embodiments described here are only intended to explain the present invention and are not intended to limit it.

Embodiment 1

Figure 1:
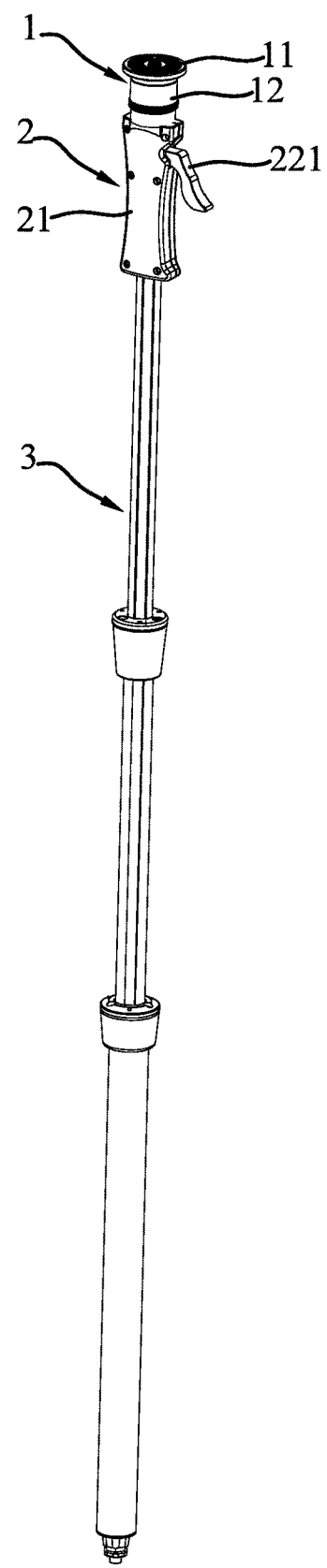
FIG. 1 shows a perspective view of a telescopic support for photographic equipment according to a first embodiment of the present invention.
Figure 2:
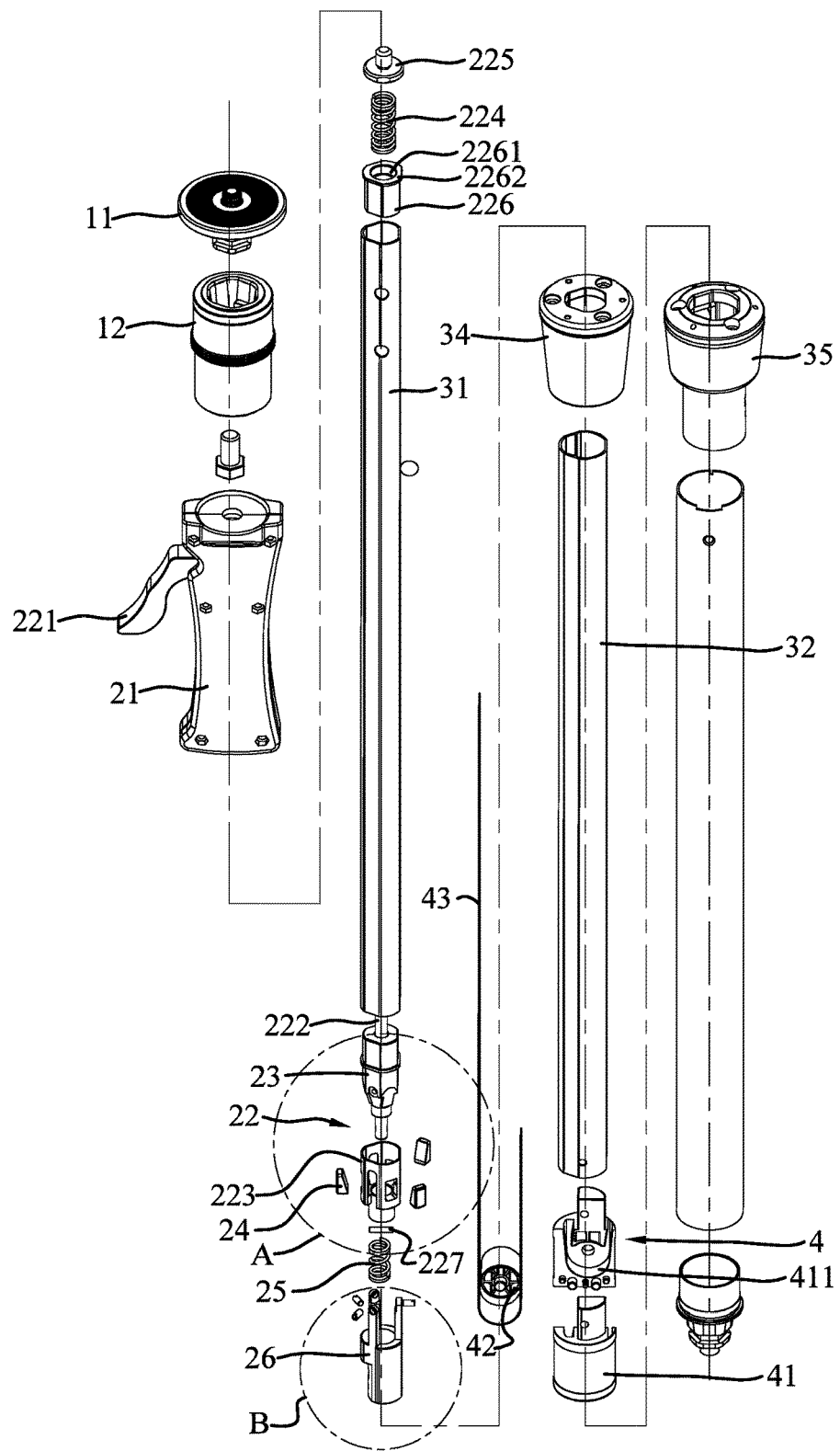
FIG. 2 shows an exploded view of the telescopic support shown in FIG. 1.
Figure 3:
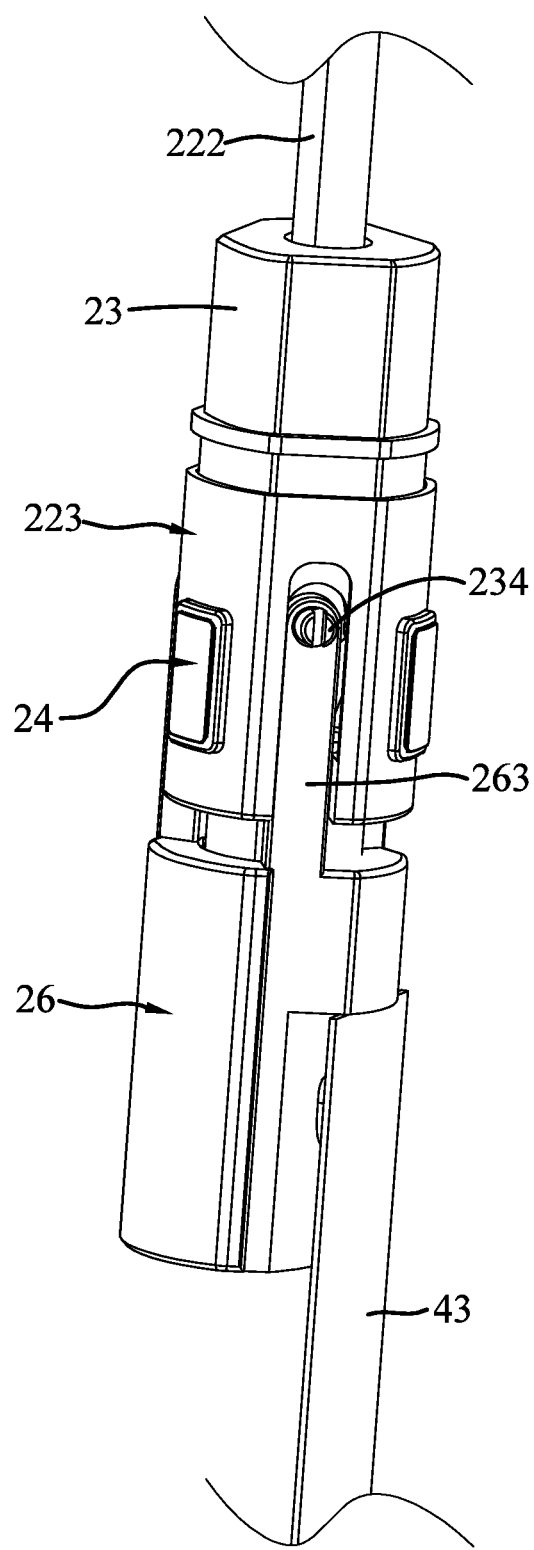
FIG. 3 shows a perspective view of partial components of the telescopic support shown in FIG. 1.

As shown in FIGS. 1 and 2, a telescopic support 200 for photographic equipment provided in an embodiment of the present invention includes a tube component 3, a locking component 2 arranged on the tube component 3, a supporting component 1 mounted on the locking component 2, and a linkage component 4 arranged in the tube component 3. The supporting component 1 is used for installing photographic equipment (such as a monitor, camera, video camera, etc.). In this embodiment, the supporting component 1 includes a connecting seat 12 mounted on an upper end of the locking component 2 and a tripod head 11 detachably mounted in the connecting seat 12. Preferably, the photography equipment is preattached to the tripod head 11. When in use, the photography equipment preattached to the tripod head 11 can be quickly connected to the connecting base 12 to achieve an installation of the photography equipment on the telescopic support 200. The connecting base 12 and the tripod head 11 can adopt existing structures in the prior art, and will not be explained in detail here. The tube component 3 includes a plurality of tubes which can move relative to each other. Preferably, the tube component 3 includes a first tube 31, a second tube 32 movably connected to the first tube 31, and a third tube 33 movably connected to the second tube 32. Here, the tube component 3, which includes three tubes, is illustrated as an example. In this embodiment, the first tube 31, the second tube 32, and the third tube 33 are profiled tubes, respectively. The first tube 31 is sleeved in the second tube 32 through a first connecting sleeve 34, and the second tube 32 is sleeved in the third tube 33 through a second connecting sleeve 35. The locking component 2 can lock and unlock an connection between the first tube 31, the second tube 32, and the third tube 33 of the tube component 3, and with a cooperation of the linkage component 4, can achieve a height adjustment of the tube component 3 according to user's needs.

In this embodiment, the locking component 2 includes a housing 21, a driving component 22, a first base 23, a locking member 24, and a second base 26. Referring to FIGS. 2 to 6, the housing 21 is mounted at an upper end of the first tube 31 of the tube component 3. Preferably, the upper end of the first tube 31 partially extends into the housing 21. Some components of the driving component 22 are arranged in the housing 21, and another some components are arranged in the first tube 31. The first base 23 is fixed at an lower end of the first tube 31. The locking member 24 is arranged in the driving component 22 and can move relative to the driving component 22. The second base 26 is mounted on the first base 23, which means that the first tube 31, the first base 23, and the second base 26 are fixed relative to each other. The driving component 22 passes through the first tube 31 and the first base 23 in a vertical direction and extends into the second base 26.

The driving component 22 includes a driving member 221 mounted in the housing 21, a rod 222 which can be pushed by the driving member 221, a first elastic element 224 sleeved on an outer side of an upper axial end of the rod 222 and abutted against the driving member 221, and a locking seat 223 connected with a lower axial end of the rod 222. One end of the driving member 221 is rotatably arranged in the housing 21, and an other end extends from the housing 21. Preferably, the driving member 221 is substantially L-shaped. The L-shaped driving member 221 includes a transverse part arranged in the housing 21 and a vertical part arranged on an outer side of the housing 21. When the driving member 221 is in a locked position, the transverse part tilts upwards, and when the driving element 221 is in a unlocked position, the transverse part is in a horizontal state. In this embodiment, the vertical part of the driving member 221 is configured as a spanner, and the user can unlock the tube component 3 by pressing the vertical part of the driving member 221, and lock the tube component 3 by releasing the driving member 221. The first elastic element 224 abuts against the driving member 221 to automatically push the driving member 221 from the unlocked position to the locked position. In this embodiment, the first elastic element 224 is a spring. The first elastic element 224 is positioned in a sleeve 226 mounted in the upper end of the first tube 31 of the tube component 3. The sleeve 226 is hollow. An inner side of the sleeve 226 is provided with a step hole 2261. The first elastic element 224 is at least partially mounted in the step hole 2261. An outer side of an upper end of sleeve 226 is provided with a flange 2262 which extends radially outward. The flange 2262 is pressed against the upper end of the first tube 31 to position the sleeve 226 in an axial direction. Preferably, a block member 225 is mounted at a position where the driving member 221 is in contact with the first elastic element 224. The block member 225 is mounted in the driving member 221 through threaded connection, and the block member 225 can adjust its protrusion height relative to the driving member 221 to compensate for an assembly error between the driving member 221 and the first elastic element 224. The two axial ends of the rod 222 respectively extend beyond two axial ends of the first tube 31. In this embodiment, the rod 222 passes through the step hole 2261 of the sleeve 226, extends downwards to the first base 23, and exits from the first base 23 to the second base 26. Preferably, the upper axial end of the rod 222 abuts against the block member 225 below the driving member 221. The lower axial end of rod 222 is mounted with the locking seat 223 through a connecting pin 227. The locking seat 223 is located between the first base 23 and the second base 26, and can move relative to the first base 23 and the second base 26.

In this embodiment, the locking seat 223 is hollow. The locking seat 223 is provided with a locking seat body 2230, at least one slot 2232, at least one through hole 2233, and a connecting column 2234. The locking seat body 2230 is substantially in a shape of a hollow column. An inner side of the locking seat body 2230 is provided with an engaging hole 2231 for engaging a lower part of the first base 23. The at least one slot 2232 is opened on a circumferential wall of the locking seat body 2230, and is facing downwards. The at least one through hole 2233 is arranged on the circumferential wall of the locking seat body 2230, and runs through the circumferential wall of the locking seat body 2230 along the radial direction thereof. In this embodiment, the at least one slot 2232 includes three slots. The three slots are arranged at equal intervals along a circumferential direction of the locking seat body 2230. The at least one through hole 2233 includes three through holes. The three through holes are arranged at equal intervals along the circumferential direction of the locking seat body 2230. Preferably, a through hole is provided between two adjacent slots 2232. The locking member 24 is arranged in the through hole 2233. The locking member 24 is a locking block which engages in the through hole 2233. The connecting column 2234 is arranged below the locking seat body 2230 and is hollow. The lower axial end of the rod 222 is located in the connecting column 2234, and the connecting pin 227 is inserted into the connecting column 2234 to connect the lower axial end of the rod 222 with the connecting column 2234, and thus, when the rod 222 is pushed by the driving member 221, the locking seat 223 can be driven to move downwards. In this embodiment, the locking seat 223 can move vertically relative to the first base 23 and the second base 26.

The first base 23 includes a first base body 231 and a first slope 232 arranged on a lower side of the first base body 231. The first slope 232 gradually shrinks downwards from the lower side of the first base body 231. A position of the first slope 232 corresponds to the through hole 2233 of the locking seat 223. In this embodiment, there are three first slopes 232. The locking member 24 located in the through hole 2233 is provided with a second slope 241 which fits with the first slope 232. The second slope 241 is fitted to the first slope 232. When the tube component 3 is in a locked state, the three first slopes 232 are opposite to the three through holes mentioned above, respectively, and at this time, the locking member 24 located in the through hole 2233 extends from the through hole 2233 and is pressed against the first slope 232, that is, the locking member 24 is pushed outward along a radial direction of the locking seat 223 by the first slope 232 and pressed against the second tube 32, thereby locking the first tube 31 and the second tube 32. When the tube component is in an unlocked state, the locking member 24 moves downwards relative to the first base 23, that is, the through hole 2233 moves downwards, to drive the locking member 24 to move downwards, and the second slope 241 of the locking member 24 moves downwards along the first slope 232. As the second slope 241 moves downwards, the locking member 24 moves inward along the radial direction of the locking seat 223, releases a contact with the second tube 32, thereby unlocking the first tube 31 and the second tube 32. Preferably, the locking member 24 is provided with a friction plate 242 on a side away from the second slope 241, i.e., a side towards the second tube 32, to increase a friction between the locking member and the second tube 32. In addition, the first base body 231 is provided with a first mounting hole 233 for connecting with the second base 26. Preferably, the first mounting hole 233 is located between two adjacent first slopes 232. A fixed pin 234 is inserted into the first mounting hole 233 to install the second base 26 on the first base 23.

The second base 26 includes a second base body 261, a connecting rod 263 arranged on an upper side of the second base body 261, and a recess 262 arranged on a lower side of the second base body 261. In this embodiment, the second base body 261 is substantially cylindrical. An interior of the second base body 261 is provided with a receiving hole 264 with an opening facing upwards. The locking seat 223 is partially received in the receiving hole 264. Preferably, the connecting column 2234 of the locking seat 223 can be at least partially located in the receiving hole 264. A second elastic element 25 is arranged in the receiving hole 264 and abuts against between the connecting column 2234 and the receiving hole 264. Preferably, the second elastic element 25 is a spring. The connecting rod 263 extends upwards from the upper side of the second base body 261. An end of the connecting rod 263 far from the second base body 261 is provided with a second mounting hole 265. The fixed pin 234 passes through the second mounting hole 265 and the first mounting hole 233 to install the second base 26 on the first base 23, wherein the connecting rod 263 can be engaged in the slot 2232 of the locking seat 223, so that a fit between the connecting rod 263 and the slot 2232 can prevent a rotation of the locking seat 223. The recess 262 is arranged on a side of the second base body 261, and is formed by concave from the side of the second base body 261. An end of the driving component 4 is mounted on the recess 262.

In this embodiment, the linkage component 4 includes a fixed seat 41 arranged at a lower end of the second tube 32, a rotating wheel 42 mounted in the fixed seat 41, and a linkage member 43 which is wound around the rotating wheel 42. The fixed seat 41 is provided with a receiving slot 411, and the rotating wheel 42 is mounted in the receiving slot 411. Preferably, the receiving slot 411 is substantially U-shaped. The rotating wheel 42 is arranged at a bottom of the U-shaped receiving slot 411. The linkage member 43 enters from one end of the U-shaped receiving slot 411, bypasses the rotating wheel 42, and then exits from other end of the U-shaped receiving slot 411. In this embodiment, the linkage member 43 is in a sheet shape. One end of the linkage member 43 is fixed on and outer side of the recess 262, and other end is fixed on the second connecting sleeve 35. Specifically, the linkage member 43 enters into one end of the receiving slot 411 along the inner side of the second tube 32 from the recess 262, winds out from a gap between the rotating wheel 42 and the receiving slot 411, extends from the other end of the receiving slot 411, and then extends along the outer side of the second tube 32 to the second connecting sleeve 35.

Figure 10:
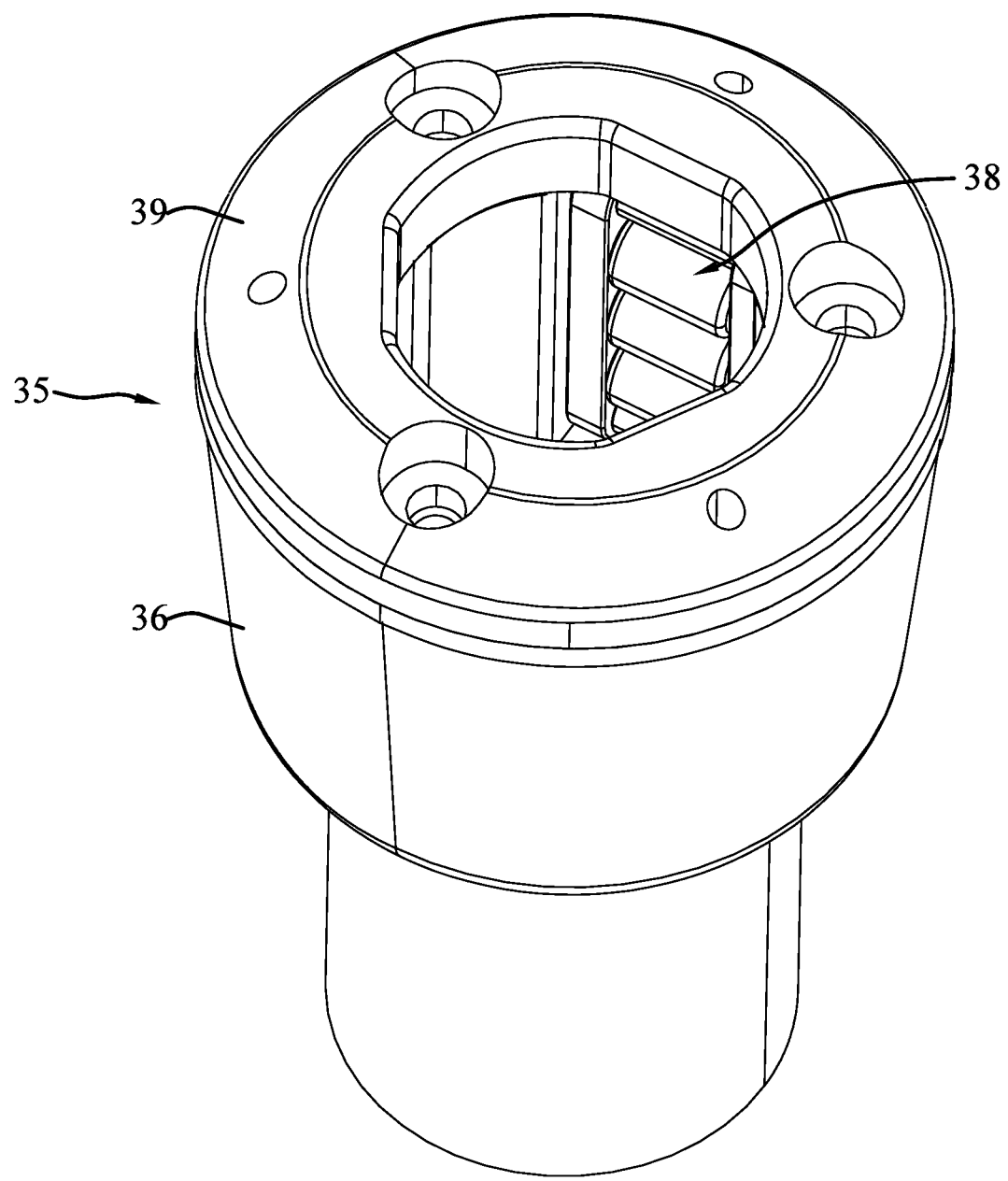
FIG. 10 shows a perspective view of a connecting sleeve of the telescopic support shown in FIG. 1.
Figure 11:
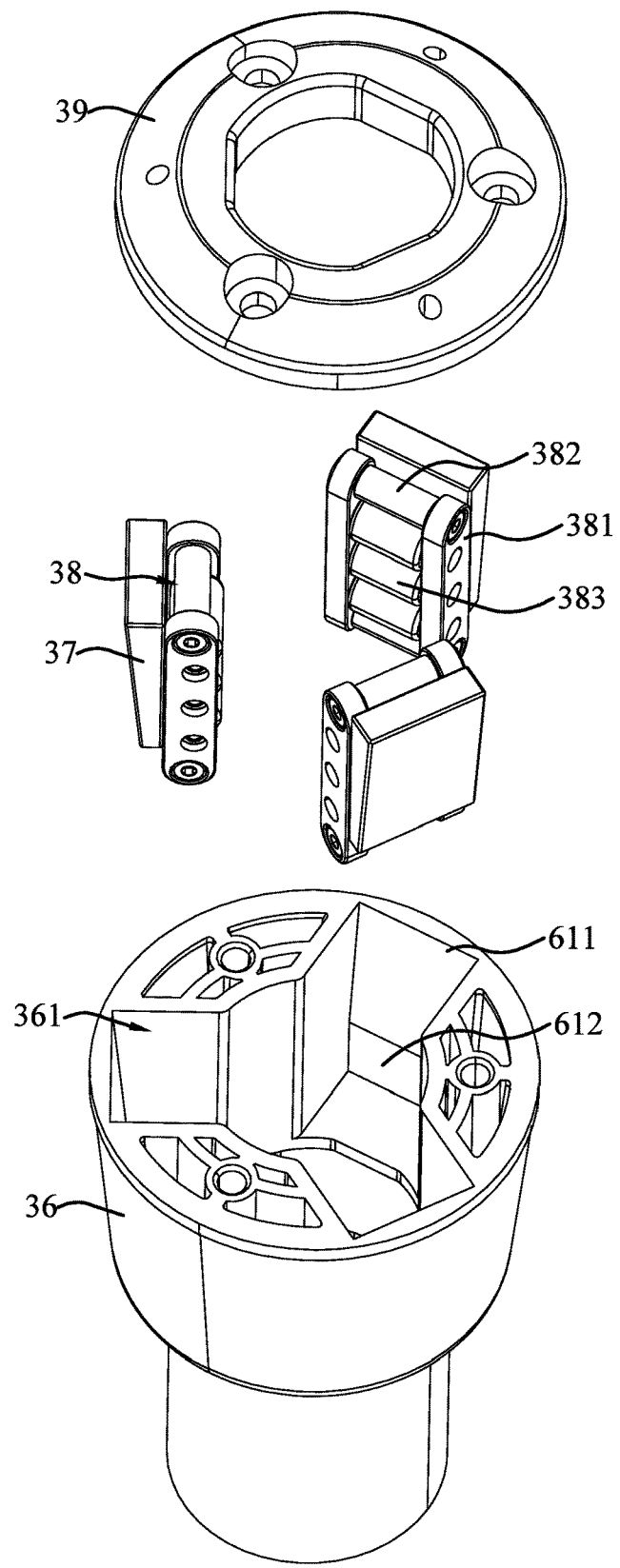
FIG. 11 shows an exploded view of the connecting sleeve shown in FIG. 10.
Figure 12:
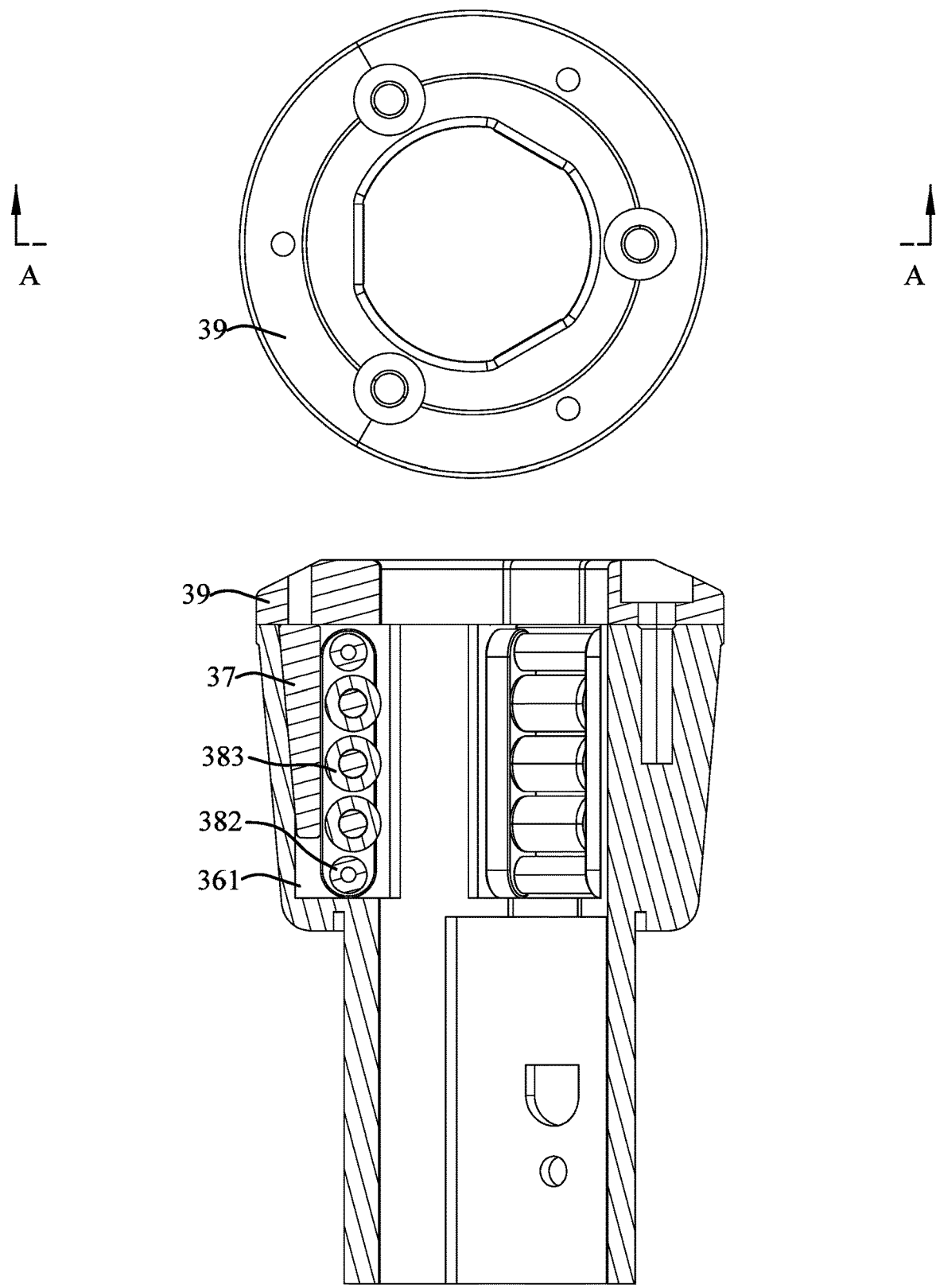
FIG. 12 shows a cross-sectional view of the connecting sleeve along line A-A as shown in FIG. 10.

Preferably, the construction of the first connecting sleeve 34 is the same as the construction of the second connecting sleeve 35. In this embodiment, the second connecting sleeve 35 is used as an example for explanation. Referring to FIGS. 2, 10 and 12, the second connecting sleeve 35 includes a tube sleeve 36 mounted on the third tube 33, a barrier plate 39 mounted on the tube sleeve 36, and at least one wheel set 38 arranged in the tube sleeve 36, wherein the at least one wheel set 38 is pressed towards the second tube 32 sleeved in the third tube 33 through a wedge block 37. In this embodiment, the tube sleeve 36 is inserted at a top end of the third tube 33, and the second tube 32 is inserted into the third tube 33 through the tube sleeve 36. The tube sleeve 36 is substantially in a shape of a hollow column. The inner side of the tube sleeve 36 is provided with at least one groove 361 which is radially concave outward. The groove 361 opens towards the barrier plate 39. The at least one wheel set 38 is received in the at least one groove 361, and the wedge block 37 is clamped between the at least one wheel set 38 and the at least one groove 361. A side of the wedge block 37 facing the at least one groove 361 is set as an inclined plane. A surface of the at least one groove 361 abutting against the wedge block 37 is provided as a third slope 611 which matches the inclined plane of the wedge block 37. Preferably, a lower part of the third slope 611 is provided as a plane 612. The wedge block 37 cooperates with the third slope 611 to press the at least one wheel set 38 against the second tube 32 to compensate for a virtual position or installation tolerance issues on the second tube 32 and the inner side of the second connecting sleeve 35. At the same time, a configuration of the at least one wheel set 38 also ensures that the second tube 32 can move smoothly relative to the second connecting sleeve 35. In this embodiment, the at least one wheel set 38 includes three wheel sets. The three wheel sets are arranged at equal intervals along the circumferential direction of the tube sleeve 36. The at least one wheel set 38 includes a wheel frame 381, two connecting shafts 382 respectively mounted at two ends of the wheel frame 381, and a plurality of wheels 383 mounted on the wheel frame 381. Preferably, the plurality of wheels 383 protrude from the two connecting shafts 382 along a radial direction of the tube sleeve 36. In this embodiment, the plurality of wheels 383 include three wheels arranged side by side between the two connecting shafts 382.

Figure 4:
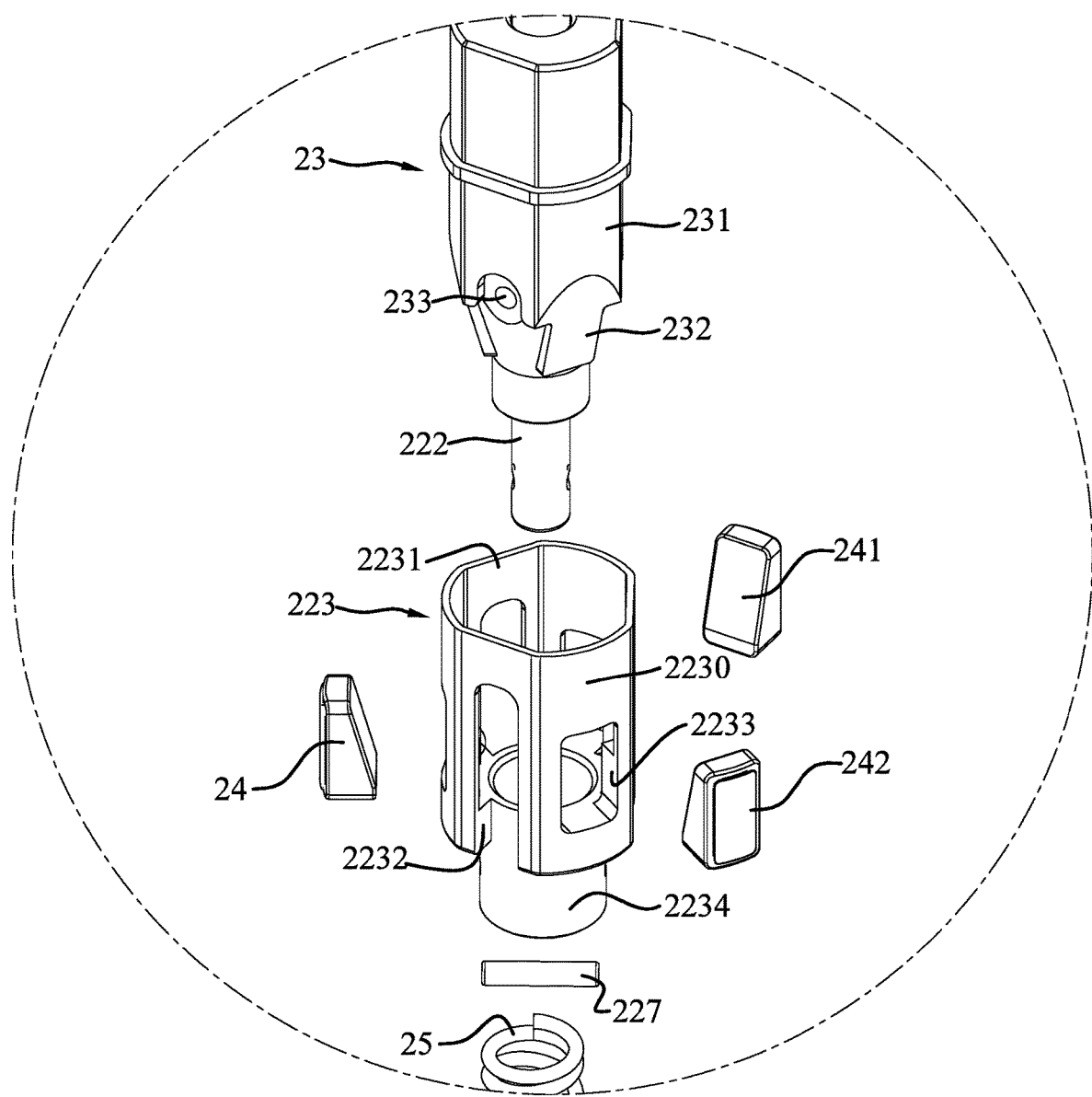
FIG. 4 shows a partially enlarged view of part A of the telescopic support shown in FIG. 2.
Figure 5:
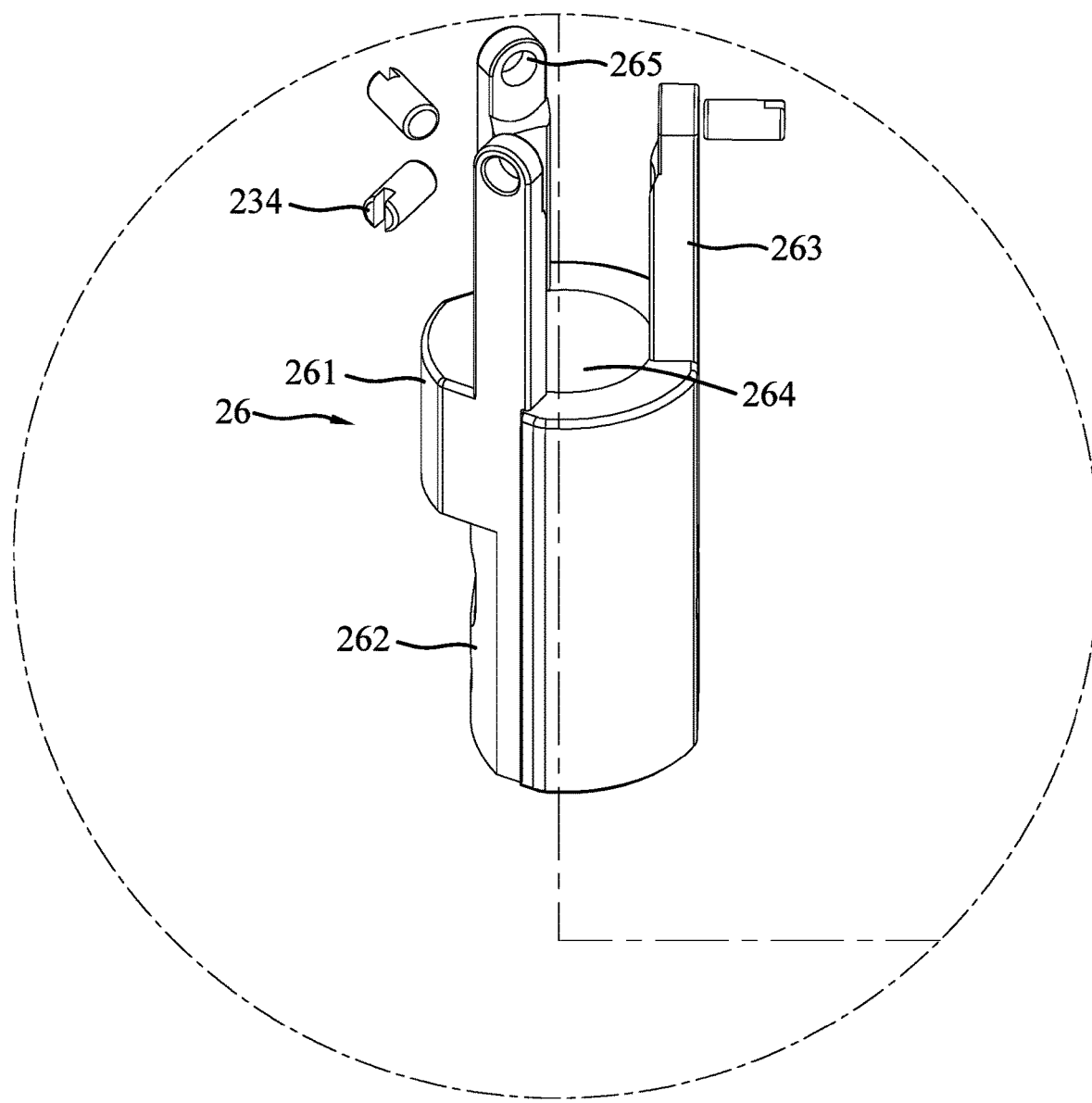
FIG. 5 shows a partially enlarged view of part B of the telescopic support shown in FIG. 2.
Figure 6:
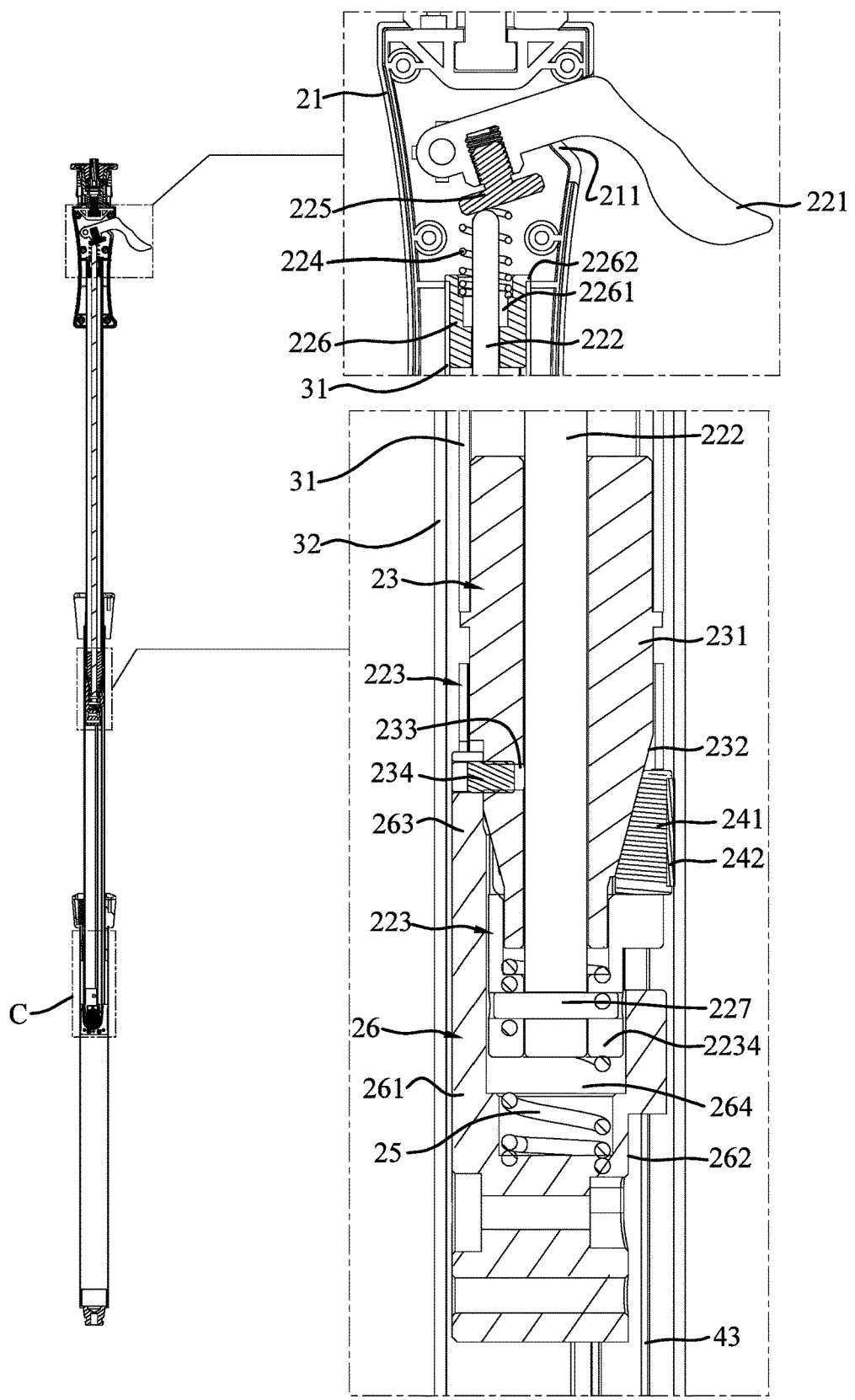
FIG. 6 shows a cross-sectional view along an axial direction of the telescopic support shown in FIG. 1, wherein a locking component of the telescopic support is in a locked state, and a partially enlarged view of partial components is further shown.
Figure 7:
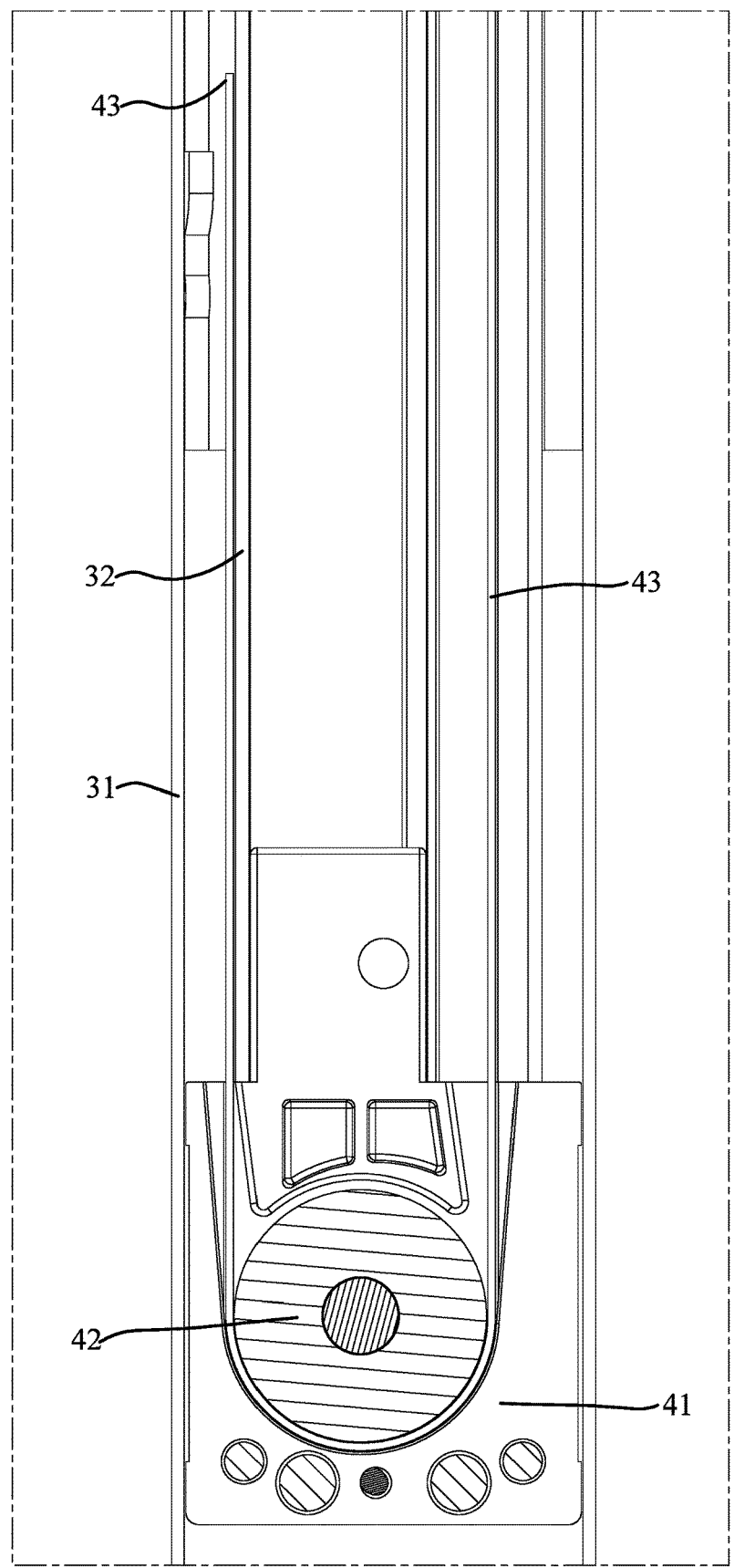
FIG. 7 shows a partially enlarged view of part C of the telescopic support shown in FIG. 6.
Figure 8:
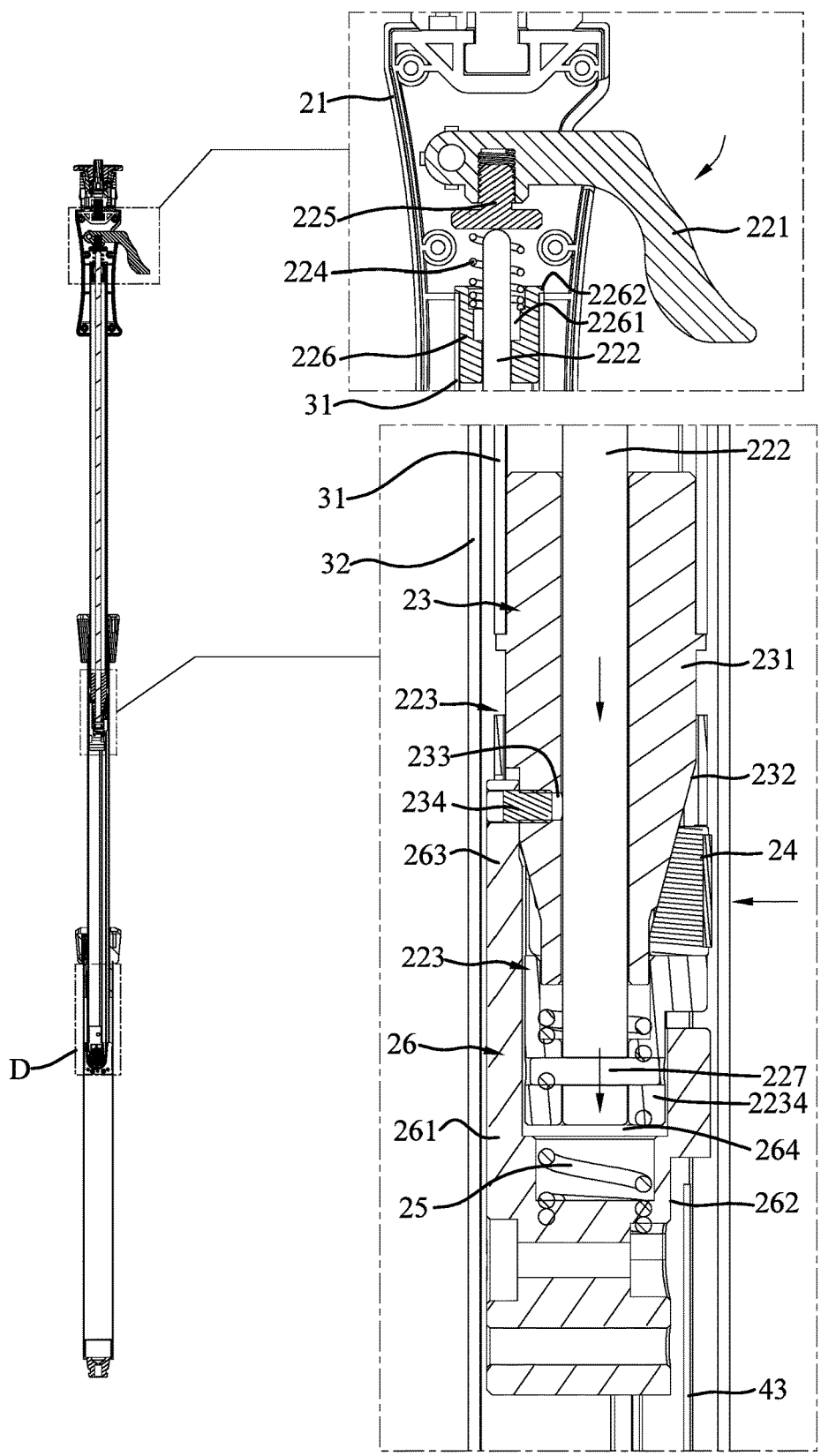
FIG. 8 shows a cross-sectional view of the telescopic support shown in FIG. 1 along its axis, wherein the locking component of the telescopic support is in an unlocked state, and shows a partially enlarged view of some components and a direction of movement of the some components.
Figure 9:
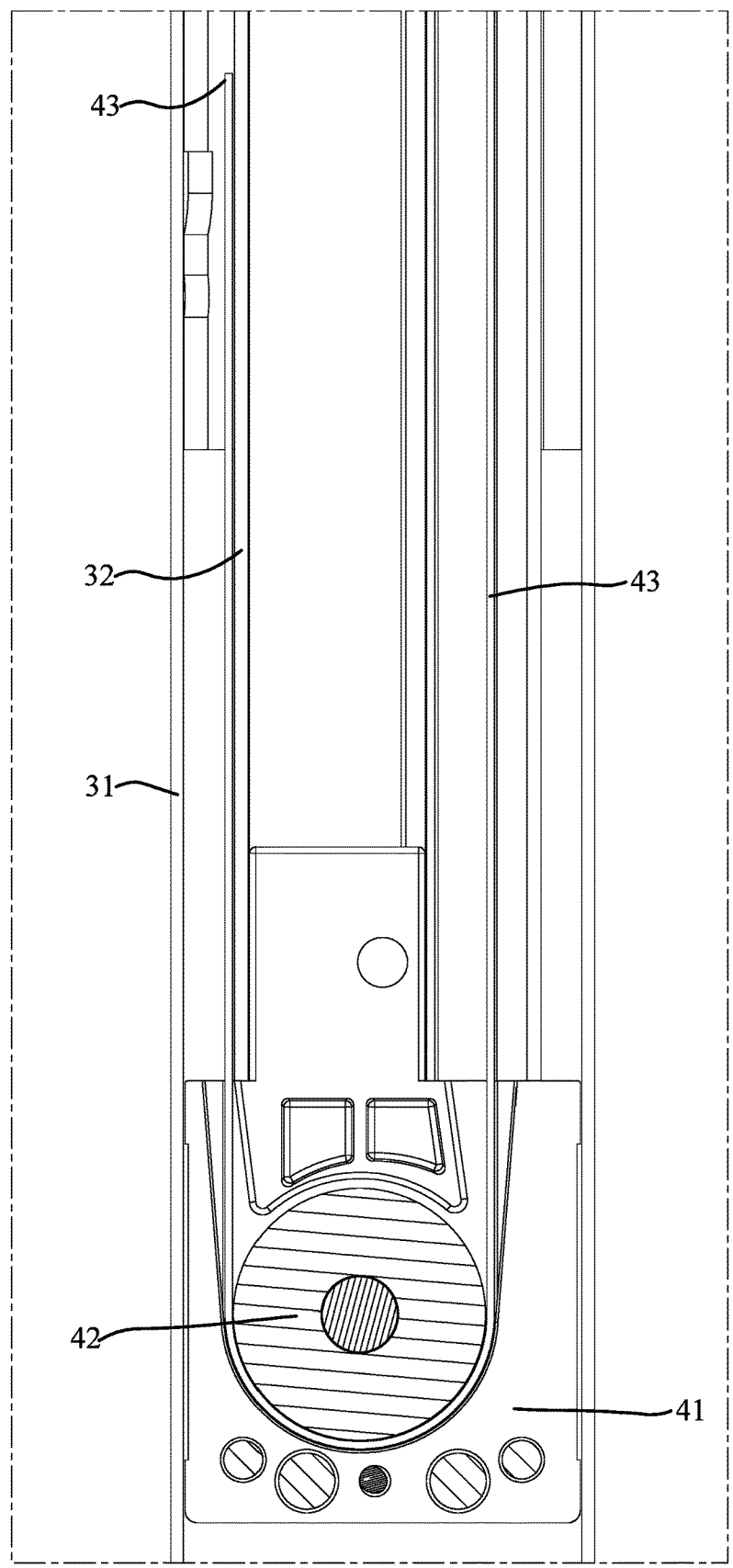
FIG. 9 shows a partially enlarged view of part D of the telescopic support shown in FIG. 8.

Referring to FIGS. 6 to 9, when using the telescopic support 200 of the present invention, the user presses on the driving member 221 (preferably, when the driving member 221 is in the unlocked position, and the transverse part is in a horizontal state), the lower side of the driving member 221 moves downwards, the first elastic element 224 is compressed, and simultaneously the rod 222 is pushed to move downwards, the rod 222 drives the locking seat 223 to move downwards, and the locking member 24 engaged in the through hole 2233 of the locking seat 223 (as shown in FIG. 4) moves downwards, at the same time, due to the fit between the first slope 232 of the first base 23 and the second slope 241 of the locking member 24, the locking member 24 is provided with a space to move inward, thereby detaching from the inner side of the second tube 32, unlocking the connection between the first tube 31 and the second tube 32, allowing the user to perform relative movement between tubes. At this point, an end of the linkage member 43 of the linkage component 4 fixed at the recess 262 can move with the movement of the first tube 31 relative to the second tube 32. When the position of the linkage member 43 changes with the movement of the first tube 31 relative to the second tube 32, the length of the linkage member 43 between the recess 262 and the receiving slot 411 is changed, resulting in a change in the length of the linkage member 43 between the second connecting sleeve 35 and the receiving slot 411, which drives a relative movement between the second tube 32 and the third tube 33, and thus achieving simultaneous movement between the first tube 31, the second tube 32, and the third tube 33.

When the height of tube component 3 reaches a required height, the driving member 221 is released, the driving member 221 deflects upwards under an action of the first elastic element 224. At this time, under a downward force applied by the photographic equipment mounted on the tripod head 11 of the support component 1, the first slope 232 of the first base 23 acts on the second slope 241 of the locking member 24, and the locking member 24 is moved outward, and the locking member 24 abuts against the inner side of the second tube 32 to achieve fixation. More preferably, under the action of the second elastic element 25 arranged between the locking seat 223 and the second base 26, the locking seat 223 is pressed upwards by the second elastic element 25, at the same time, under the action of the first slope 232 of the first base 23 and the second slope 241 of the locking member 24, it can effectively ensure that a self-locking state of the tube component 3 can be achieved without adding any external locking structure.

Embodiment 2

Figure 13:
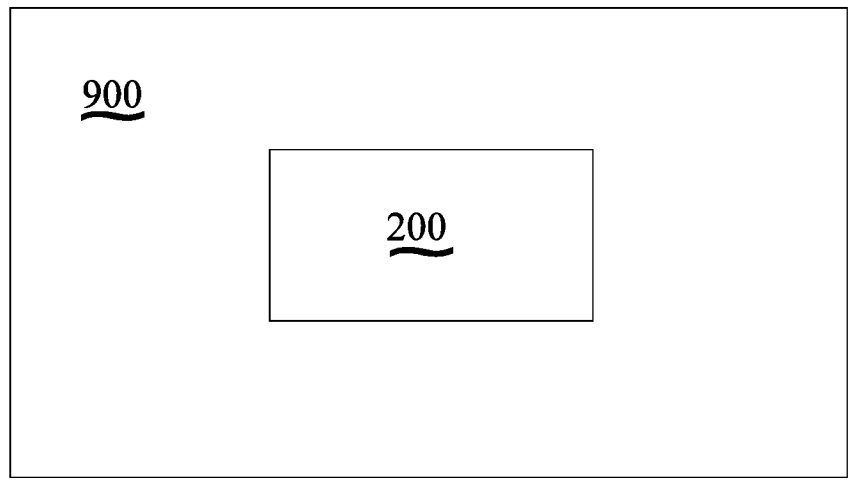
FIG. 13 shows a schematic view of a photographic equipment assembly in a second embodiment of the present invention.

A second embodiment of the present invention provides a photographic equipment component. As shown in FIG. 13, the photographic equipment component 900 of the present invention includes the aforementioned telescopic support 200 and a photographic equipment (such as a monitor, camera, video camera, etc.) mounted on the telescopic support 200.

Embodiment 3

Figure 14:
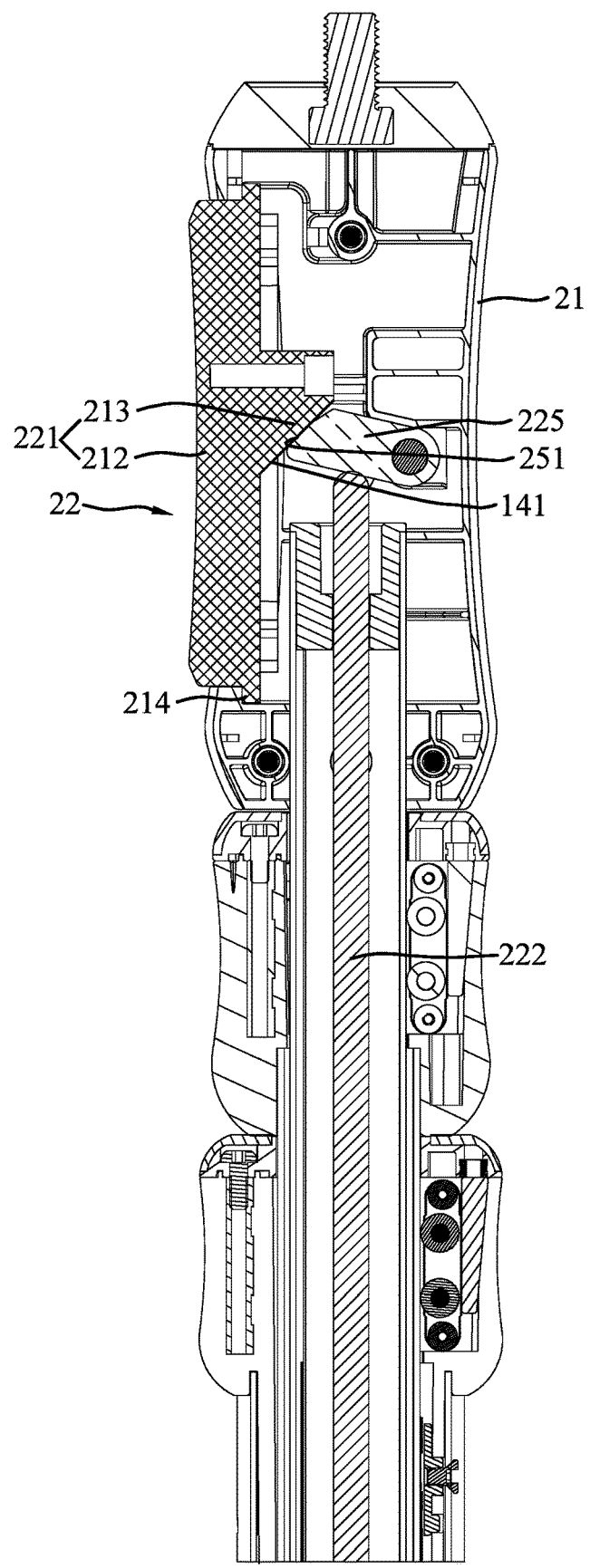
FIG. 14 shows a cross-sectional view along an axial direction of a telescopic support for photographic equipment in a third embodiment of the present invention, wherein a locking component of the telescopic support is in a locked state and some components are omitted.
Figure 15:
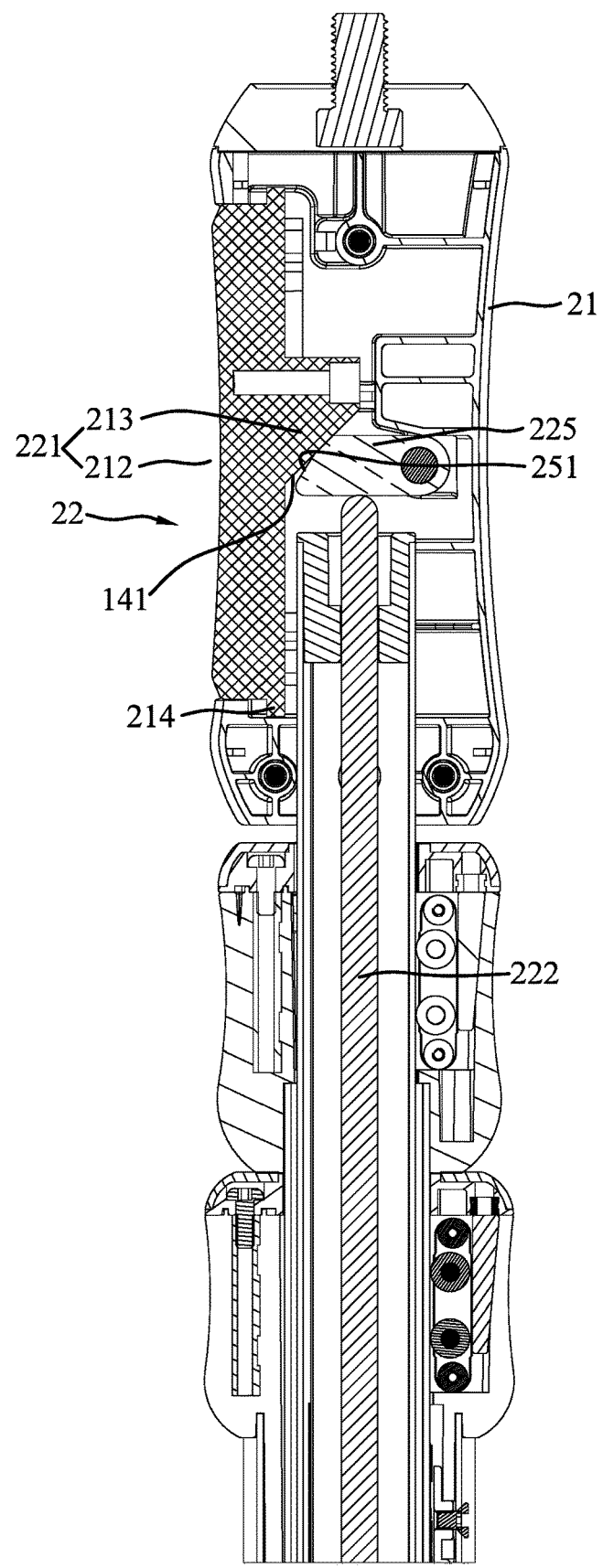
FIG. 15 shows a cross-sectional view along the axial direction of a telescopic support for photographic equipment in the third embodiment of the present invention, wherein the locking component of the telescopic support is in an unlocked state and some components are omitted.

As shown in FIGS. 14 and 15, a third embodiment of the present invention provides a telescopic support 200 for photographic equipment. The difference between the third embodiment and the first embodiment is that the construction of the driving component 22 of the third embodiment is different from the driving component of the first embodiment.

In this embodiment, the drive component 22 includes a drive member 221 mounted in the housing 21, a rod 222 which can be pushed by the drive member 221, and a locking seat connected with a lower axial end of the rod 222. In this embodiment, the construction of the rod 222 and the locking seat is consistent with the construction of the rod 222 and the locking seat of the first embodiment, and will not be explained in detail here.

The driving member 221 is movably arranged in the housing 21. Preferably, the driving member 221 includes a first portion 212 partially arranged in the housing 21, and a second portion 213 arranged on an inner side of the first portion 212. The first portion 212 protrudes from the housing 21 and can be driven by the user to achieve the unlocking state of the tube component. In this embodiment, the first portion 212 is substantially a square shape. The inner side of the first portion 212 is provided with a projection 214, which is used to clamp the driving member 221 into the housing 21 to prevent the driving member 221 from detaching from the housing 21. The second portion 213 protrudes from the inner side of the first portion 212. The side of the second portion 213 facing the rod 222 is configured as a first contact surface 141. A stop member 225 is rotatably arranged in the housing 21, and a block member 225 is engaged between the driving member 221 and the rod 222. An end of the block member 225 is provided with a connecting hole for rotatably installing the block member 225 in the housing 21. An other end of the block member 225 abuts against the second portion 213 of the driving member 221. Specifically, the portion of the block member 225 which abuts against the second portion 213 is configured as a second contact surface 251. The second contact surface 251 is in contact with the first contact surface 141. The rod 222 is pressed against the lower side of block member 225. The user presses the first portion 212 of the driving member 221, and the block member 225 rotates downwards with a cooperation of the first contact surface 141 and the second contact surface 251, thereby pushing the rod 222 downward.

The telescopic support for photographic equipment provided by the present invention is capable of easily and quickly locking and releasing a connection between the tubes of the tube component, has a reliable locking effect, and improves the safety of the connection.

In summary, the above is only a preferred embodiment of the present invention and is not intended to limit the scope of its implementation. Therefore, any equivalent changes and modifications made based on the content of the present invention should belong to the technical scope of the present invention.

The invention claimed is:

1. A telescopic support for photographic equipment, comprising: a tube component, a locking component arranged on the tube component, a supporting component mounted on the locking component, and a linkage component arranged in the tube component, the locking component comprising a housing, a driving component, a first base, a locking member, and a second base, wherein the housing is mounted at an upper end of a first tube of the tube component, a part of the driving component is arranged in the housing, and other part is arranged in the first tube, the first base is fixed at an lower end of the first tube, the locking member is arranged in the driving component and is capable of moving relative to the driving component, the second base is mounted on the first base, and the driving component passes through the first tube and the first base in a vertical direction and extends into the second base;

wherein the driving component comprises a driving member mounted in the housing, a rod which is capable of being pushed by the driving member, a first elastic element sleeved on an outer side of an upper axial end of the rod and abutted against the driving member, and a locking seat connected with a lower axial end of the rod; and wherein the locking seat is located between the first base and the second base, and is capable of moving relative to the first base and the second base.

2. The telescopic support for photographic equipment according to claim 1, wherein two axial ends of the rod respectively extend beyond two axial ends of the first tube, the rod extends downwards to the first base, and exits from the first base to the second base.

3. The telescopic support for photographic equipment according to claim 1, wherein the locking seat is provided with a locking seat body, at least one slot, at least one through hole, and a connecting column; the at least one slot is opened on a circumferential wall of the locking seat body, and is facing downwards; the at least one through hole is arranged on the circumferential wall of the locking seat body, and runs through the circumferential wall of the locking seat body along the radial direction thereof; the connecting column is arranged below the locking seat body, a lower axial end of the rod is located in the connecting column, and a connecting pin is inserted into the connecting column to connect the lower axial end of the rod with the connecting column.

4. The telescopic support for photographic equipment according to claim 3, wherein the first base comprises a first base body and a first slope arranged on a lower side of the first base body.

5. The telescopic support for photographic equipment according to claim 4, wherein the locking member located in the through hole is provided with a second slope which fits with the first slope.

6. The telescopic support for photographic equipment according to claim 5, wherein the locking member is provided with a friction plate on a side away from the second slope.

7. The telescopic support for photographic equipment according to claim 3, wherein the second base comprises a second base body, a connecting rod arranged on an upper side of the second base body, and a recess arranged on a lower side of the second base body.

8. The telescopic support for photographic equipment according to claim 7, wherein an interior of the second base body is provided with a receiving hole with an opening facing upwards; the locking seat is partially received in the receiving hole; a second elastic element is arranged in the receiving hole and abuts against between the connecting column and the receiving hole; and the connecting rod is capable of being engaged in the slot of the locking seat.

9. The telescopic support for photographic equipment according to claim 7, wherein the linkage component comprises a fixed seat arranged at a lower end of a second tube of the tube component, a rotating wheel mounted in the fixed seat, and a linkage member which is wound around the rotating wheel.

10. The telescopic support for photographic equipment according to claim 9, wherein the linkage member enters into one end of a receiving slot along an inner side of the second tube from the recess, winds out from a gap between the rotating wheel and the receiving slot, extends from other end of the receiving slot, and then extends along an outer side of the second tube.

11. The telescopic support for photographic equipment according to claim 1, wherein adjacent tubes of the tube component are sleeved through a connecting sleeve; the connecting sleeve comprises a tube sleeve mounted on corresponding tubes, a barrier plate mounted on the tube sleeve, and at least one wheel set arranged in the tube sleeve, wherein the at least one wheel set is pressed towards a tube sleeved in the corresponding tube through a wedge block.

12. A photographic equipment component, comprising a telescopic support and a photographic equipment mounted on the telescopic support, wherein the telescopic support is the telescopic support for photographic equipment according to claim 1.

* * * * *